Jan. 7, 1947. L. F. GROOVER 2,413,761
LANDING GEAR TRUCK FOR SEMI-TRAILERS
Filed Oct. 27, 1944 2 Sheets-Sheet 1
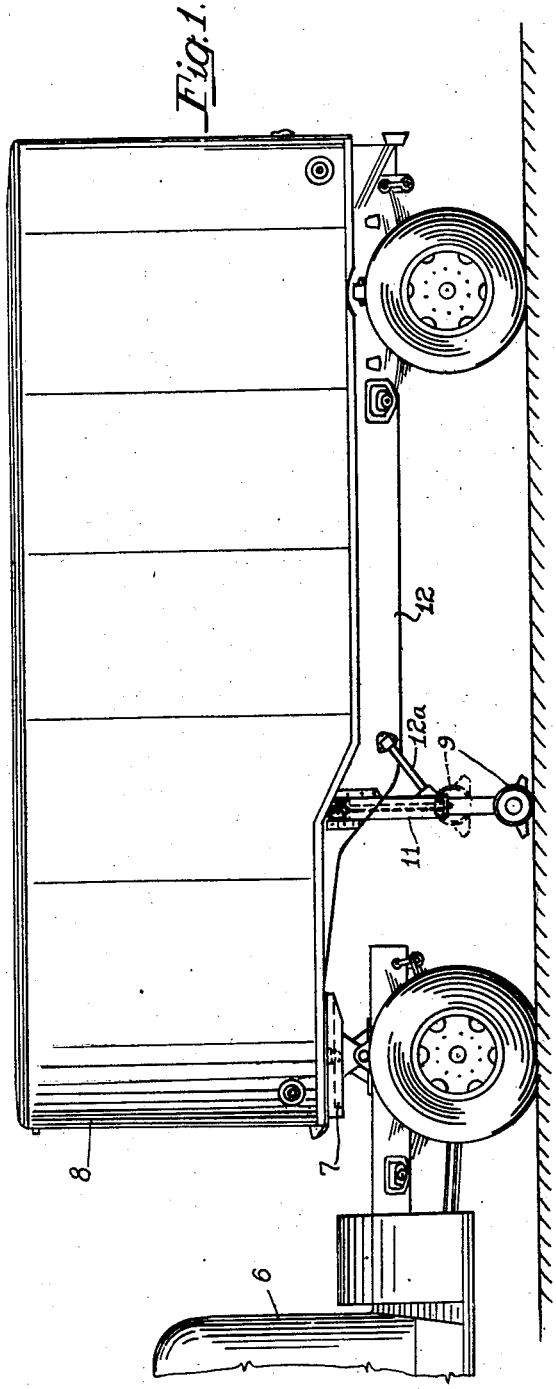
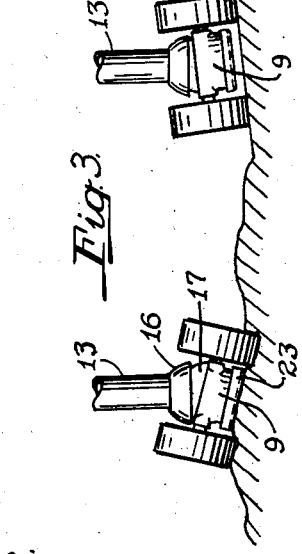
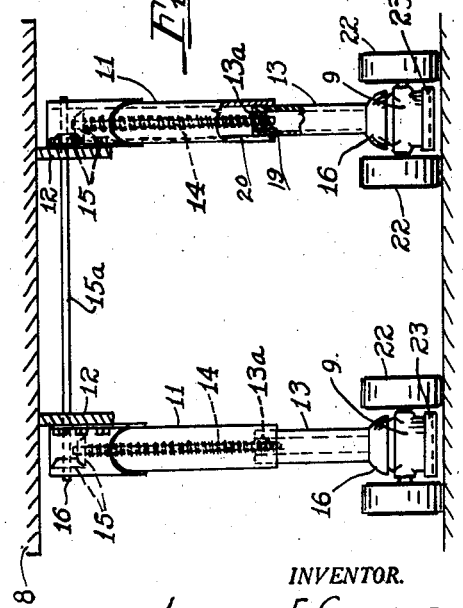
INVENTOR.
LAUREN F. GROOVER.
BY Archworth Martin
His ATTORNEY.

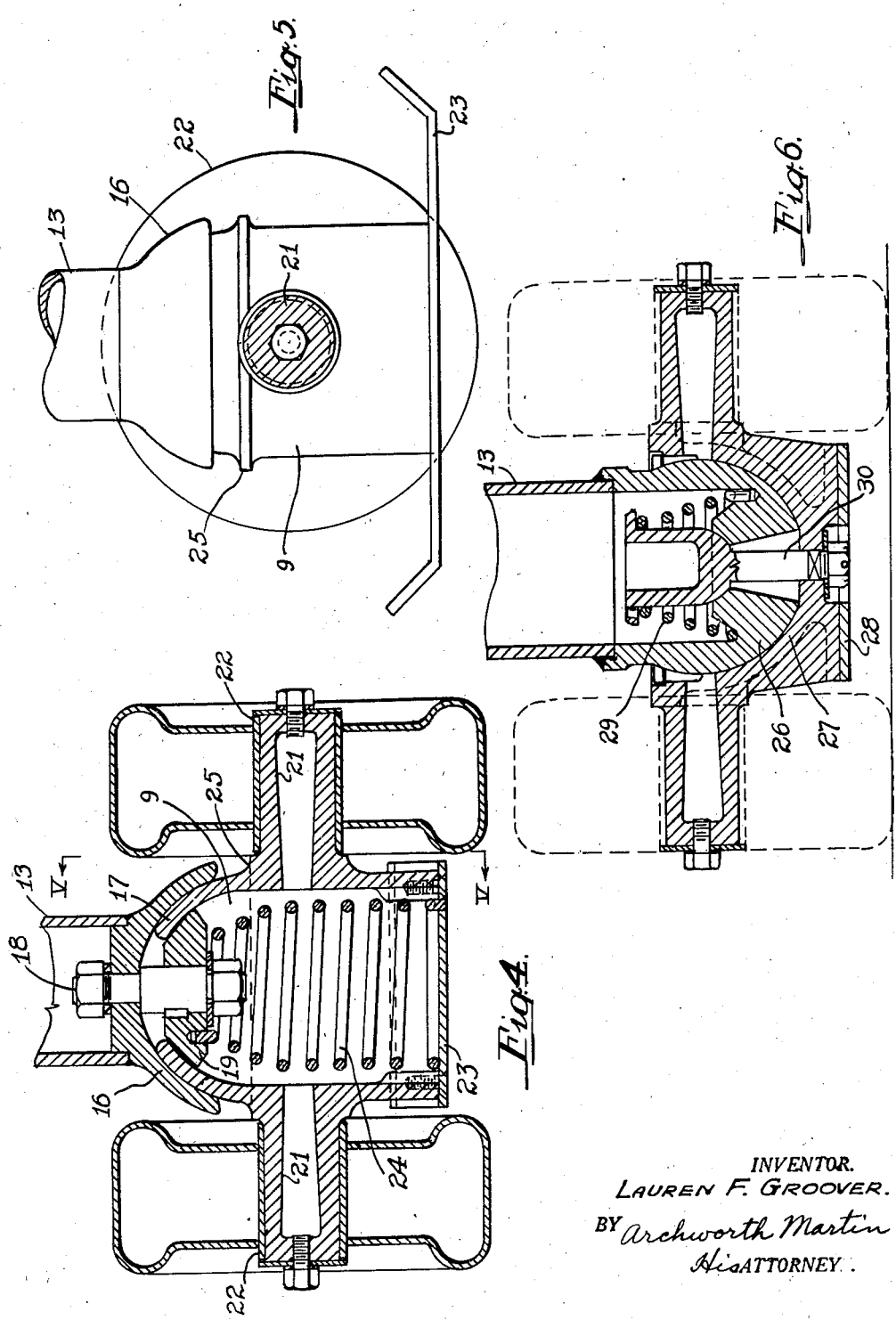

Patented Jan. 7, 1947

2,413,761

UNITED STATES PATENT OFFICE 2,413,761

LANDING GEAR TRUCK FOR SEMITRAILERS

Lauren F. Groover, Butler, Pa., assignor of one-half to Richard A. Holman, Butler, Pa.

Application October 27, 1944, Serial No. 560,620

3 Claims. (Cl. 280—109)

My invention relates to landing gear trucks for semi-trailers, and more particularly to landing gear apparatus for the front ends of the semi-trailers.

One object of my invention is to provide landing gear apparatus of the type referred to which will readily and automatically adjust itself to uneven ground upon which it may rest when the trailer is detached from the truck-tractor.

Another object of my invention is to provide means for automatically realigning the landing gear trucks, with respect to the trailer body when they are raised or elevated.

Another object of my invention is to provide means on the landing gear trucks to resist miring thereof in soft ground.

A further object of my invention is to provide a device of the character referred to, wherein an aligning spring and its associated parts in the landing gear truck is housed and sealed against moisture and dirt.

Still another object is to provide a ball and socket connection between a landing gear truck and a landing gear pedestal of the trailer body, so arranged that it is approximately at or below the axis of the landing gear truck wheels.

In the accompanying drawings, Figure 1 shows a portion of a truck-tractor with a semi-trailer connected therewith, and the landing gear trucks in lowered position; Fig. 2 is a front view on an enlarged scale of the landing gear in lowered position; Fig. 3 is a schematic view showing some of the positions which the wheels of the landing gear trucks may automatically assume when supporting a trailer body; Fig. 4 is a vertical sectional view on a further enlarged scale through one of the landing gear trucks; Fig. 5 is a view taken on the line V—V of Fig. 4; and Fig. 6 is a vertical sectional view through a modification of the structure of Fig. 4.

Referring first to Figs. 1 to 5, 6 represents a truck-tractor of any conventional form connected through a suitable form of coupling 7 with a semi-trailer 8. A landing gear comprising truck 9 is shown in lowered position, for supporting the front end of the trailer when the motor truck 6 is detached therefrom. When the trailer is to be transported, the landing gear truck will be raised to the dotted line position shown in Fig. 1.

A pair of tubular legs or pedestals 11 are rigidly secured to frame members 12 of the trailer and are braced by struts 12a. Tubes 13 that have nuts 13a secured in their upper end have telescopic engagement with the legs 11. They are raised and lowered therein by screws 14 which engage the threads on the interiors of the nuts 13a, the screws being operated by gearing 15 and a shaft 15a to which a crank will be attached to turn the shaft and the gear wheels. If desired, conventional forms of fluid pressure apparatus could be used for raising and lowering the trucks. The tubes 13 have studs 19 that extend into slots 20 in the members 11, to prevent rotation of the tubes when turning the screws 14.

A socket or ball cap 16 is welded or otherwise secured to the lower end of each tube or column 13 and has seated connection with a partially spherical portion 17 of the truck body 9, thus forming a joint of the ball-and-socket type. The joint member 17 is held in place by a bolt 18, and a partially-spherical washer or retainer block 19 that is keyed to the bolt and is yieldably held against the bearing member 17. The parts are so assembled that there is running clearance for the joint member 17 and suitable lubricant will be provided in the joint. The bolt 18 is rigidly secured to the bearing member 16.

Each truck has axle portions 21 on which wheels 22 have free movement. A shoe 23 that serves also as a spring seat and as a sealing or closure plate, is secured to the lower end of the truck and the spring 24 is interposed between 23 and the block 19, the ends of the spring being bent and extending into holes in the plate and the block. The spring is so tensioned that it yieldably retains the axes of the wheels in transverse relation to the longitudinal center line of the trailer. Also, the spring has full seating engagement with the plate 23 so that if the truck is tilted in a vertical plane as in Fig. 2, the spring, when the truck is raised from the ground, will restore the trucks to proper horizontal alinement. There is sufficient looseness of fit of the bearing member 17 with the members 16 and 19 that the spring will be effective to restore the truck to its normal position when the truck is raised, and there will be no idle swinging of the truck.

From the foregoing, it will be seen that the trucks will, when supporting the front end of the trailer, readily adapt themselves to unevenness of the ground, as indicated in Fig. 3, thus permitting each wheel to support approximately its share of the load. Furthermore, if the ground is soft and the wheels sink, the shoes 23 will engage the ground and assist in supporting the load, and the wheels will not sink so deeply. The extent to which the truck can tilt with respect to the column 13 is limited by a shoulder 25 that will be engaged by the lower edge or lip of the socket member 16 when the truck has tilted vertically to a predetermined distance.

Referring now to Fig. 6, the apparatus functions in substantially the same manner as the landing gear truck of the other figures, but in this case, the ball-and-socket joint is inverted and located in a lower position on the truck, the ball portion 26 of the joint being carried by the tubular column 13 and the socket portion 27 of the truck being formed in the truck body and having a ground-engaging plate or shoe 28 secured thereto. A centering spring 29 which is engaged by the upper enlarged end of the bolt 30 and a seating surface in the ball member 26 serves to return the parts to their normal position when the truck is raised. The socket portion 27 of the joint, together with the bolt 30, will have universal movement on the ball portion 26 of the joint as permitted by the clearance between the ball member 26 and the mid portion of the bolt, and as controlled by the spring 29.

In this arrangement, the ball joint is set low in the truck frame, the major portion of the vertical load being imposed thereon at about or somewhat below the axial line of the truck wheels. By this arrangement, there is less overhang of load and consequent strain on the truck frame casting—particularly when the wheels are brought into engagement with an uneven supporting surface.

It will be seen that in both forms of the invention the spring is protectively housed and that the joint is readily assemblable and disassemblable. Also, the swiveling of the trucks on vertical axes facilitates lateral shifting or turning of the front end of the trailer when supported by the trucks, as well as longitudinal movements of the trailer.

I claim as my invention:

1. A truck comprising a body portion having a pair of wheels in axially-spaced relation, ball-and-socket joint elements in superposed relation and carried by said body, between the wheels thereof, a load-carrying member extending upwardly from the upper element, the other element having axle portions that are directly supported by the wheels, and spring means for returning the truck body and its wheels to a normal vertically and horizontally alined position with respect to the load-carrying member after they have been deflected from such position, the socket portion of the joint being formed in the truck body mainly at a plane below the axis of the wheels and being upwardly exposed for the reception of the ball element of the joint.

2. A truck comprising a body portion having a pair of wheels in axially-spaced relation, ball-and-socket joint elements in superposed relation and carried by said body, between the wheels thereof, a load-carrying member extending upwardly from the upper element, the other element having axle portions that are directly supported by the wheels, and spring means for returning the truck body and its wheels to a normal vertically and horizontally alined position with respect to the load-carrying member after they have been deflected from such position, the ball element of the joint being formed on the truck body in position to serve as a seat for the socket portion of the joint, the spring serving also to maintain the joint elements in assembled relation.

3. A truck comprising a body portion having a pair of wheels in axially-spaced relation, two ball-and-socket joint elements in relatively superposed relation and carried by said body, between the wheels thereof, a load-carrying member extending upwardly from the upper joint element, the lower joint element having axle portions that are directly supported by the wheels, one of the elements having a chamber therein, a coil spring in said chamber, having one of its ends in seating engagement with an end wall of the chamber, a seat on the other joint element, for the other end of the spring, and a member for holding the joint elements in bearing engagement with each other but having clearance with one of the elements in such directions as will permit relative swinging movements of the said elements, in vertical and horizontal planes, the spring ends having interlocking engagement with their respective seats, to yieldably maintain the truck against deflection about a vertical axis.

LAUREN F. GROOVER.